Nov. 5, 1957  R. G. SIDLO  2,812,209
MULTI-POSITION GLARE SHIELD
Filed Aug. 19, 1955
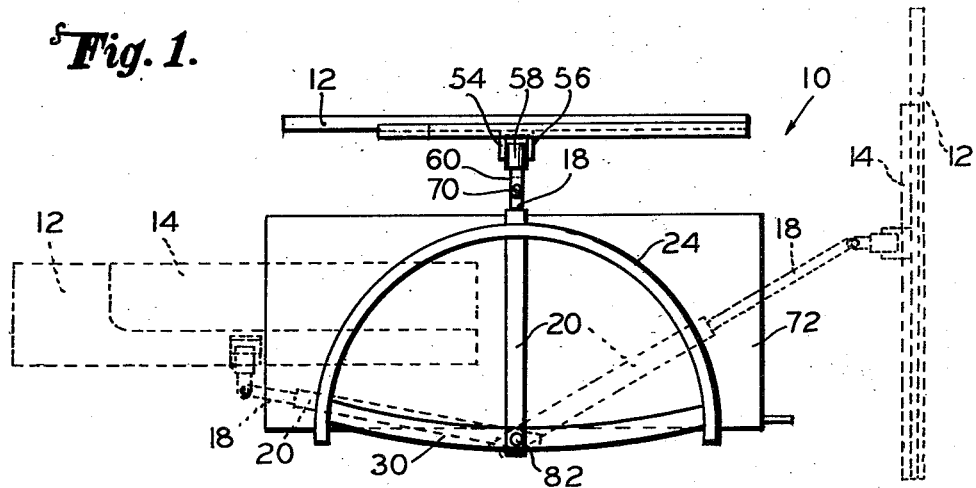
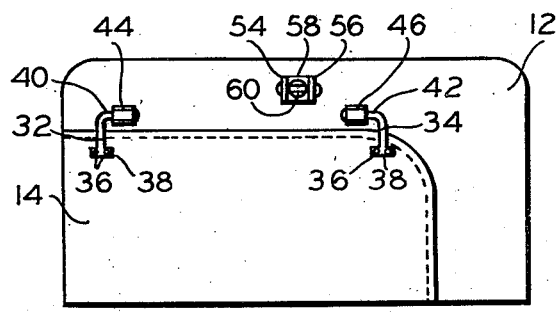
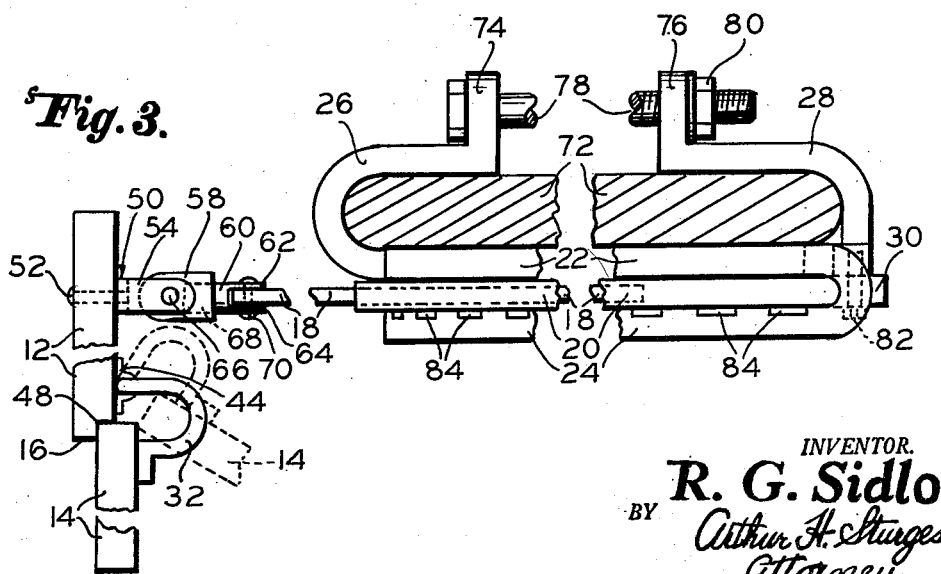
INVENTOR.
R. G. Sidlo
BY Arthur H. Sturges.
Attorney United States Patent Office 2,812,209
Patented Nov. 5, 1957

2,812,209

MULTI-POSITION GLARE SHIELD

Ralph G. Sidlo, Blue Hill, Nebr.

Application August 19, 1955, Serial No. 529,459

5 Claims. (Cl. 296—97)

This invention relates to glare shields for use in motor vehicles particularly of the type adapted to be attached to a conventional sun visor of a vehicle, and in particular a combination of a translucent glare shield having a notch in one corner and an auxiliary shield, also of translucent material, hinged to the glare shield and positioned to cover the notch therein, whereby with the glare shield carried by a telescoping arm pivotally mounted on a sun visor and extended between semi-circular guides positioned on a radius from the center of the pivotal mounting of the arm the glare shield is adapted to be adjusted to a plurality of positions so that it may intercept rays of light from substantially all directions.

The purpose of this invention is to provide a glare shield adapted to be attached to a sun visor in which the shield is adapted to be readily adjusted to substantially any position desired.

Various types of glare shields have been used in motor vehicles and such shields have been temporarily attached to sun visors and mounted on both the inside and outsides of motor vehicles, however, with the shield attached to the vehicle it is difficult to intercept rays coming from some angles and with the shield clipped over the edge of a sun visor the shield slips or drops from the visor.

With these thoughts in mind this invention contemplates a glare shield permanently attached to a sun visor in which the attaching means includes a telescoping arm swingably mounted between arcuate guides, and an auxiliary shield hinged to the glare shield and positioned to be raised to permit vision through a gap or notch in the lower edge of the glare shield.

The object of this invention is, therefore, to provide a glare shield for motor vehicles that is adapted to be mounted on a conventional sun visor of the vehicle and that is adapted to be adjusted to various positions to protect the eyes of the operator of the vehicle from substantially all glare rays.

Another object of the invention is to provide a shield for intercepting glare rays in which a portion of the shield is adapted to be opened to permit unobstructed vision when desired.

Another important object of the invention is to provide a mounting for a glare shield on a visor of a motor vehicle wherein the shield is adapted to swing from one end of the visor to the other.

It is yet another object of the invention to provide a mounting for a glare shield in which the mounting is adapted to be clamped on a sun visor of a motor vehicle and in which a telescoping arm on which the shield is carried is supported by arcuate rails between which the arm is positioned.

A further object of the invention is to provide a shield for intercepting glare rays obstructing the vision of the operator of a motor vehicle in order to insure greater safety in driving.

A still further object is to provide a glare shield for intercepting rays of light obstructing the vision of an operator of a motor vehicle in which the position of the shield is adapted to be adjusted by the operator while driving the vehicle.

And a still further object of the invention is to provide a glare shield and a mounting therefor whereby the shield is adapted to be clamped to a sun visor of a vehicle and adjusted to substantially any position for intercepting glare rays in which the shield is of a simple and economical construction.

With these and other objects and advantages in view the invention embodies a panel of translucent material having a notch or opening in the lower edge, a panel, also of translucent material, hinged to the former panel and positioned to cover the notch in the lower edge thereof, a clamp adapted to be positioned on a visor of a vehicle, a pair of semi-circular rails mounted on said clamp, a telescoping arm pivotally mounted on the clamp and positioned to slide between the rails, and a universal joint connecting the panels to the extended end of the telescoping arm.

Other features and advantages of the invention will appear from the following description taken in connection with the drawings, wherein:

Figure 1 is a view looking upwardly toward the under surface of a sun visor of a motor vehicle showing the improved glare shield mounted on the visor.

Figure 2 is a rear elevational view of the shield with the mounting elements omitted.

Figure 3 is a side elevational view of the improved glare shield, with a conventional sun visor shown in section, with parts broken away, and with the parts shown on an enlarged scale.

While one embodiment of the invention is illustrated in the above-referred to drawings, it is to be understood that they are merely for the purpose of illustration and that various changes in construction may be resorted to in the course of manufacture in order that the invention may be utilized to the best advantage according to circumstances which may arise, without in any manner departing from the spirit and intention of the device, which is to be limited only in accordance with the appended claims. And while there is stated the primary field of utility of the invention it remains obvious that it may be employed in any other capacity wherein it may be found applicable.

In the accompanying drawings, and in the following specification, the same reference characters are used to designate the same parts and elements throughout, and in which the numeral 10 refers to the invention in its entirety, numeral 12 indicating a mounting panel of translucent material providing a glare shield, numeral 14 an auxiliary panel, also of translucent material, providing an auxiliary shield positioned to cover a notch or opening 16 in the panel 12, numeral 18 a telescoping arm connected to the glare shield 12 with a universal joint and slidably mounted in a flat tube 20, rectangular-shaped in cross section, numerals 22 and 24 semi-circular rails between which the tube 20 is slidably mounted, numerals 26 and 28 jaws of a clamp for mounting the shield upon a sun visor, and numeral 30 an arcuate bar connected across the ends of the rails or guides 22 and 24 and providing means for connecting the ends of the rails to the tube 20.

The auxiliary shield 14 is provided with arms 32 and 34 which are secured to the shield with fasteners, such as the rivets 36, extended through flanges 38, and the arms, which are L-shaped, are provided with extended ends 40 and 42 that are rotatably mounted in sockets 44 and 46 on the back of the glare shield 12. By this means the auxiliary shield 14 is adapted to swing upwardly to permit unobstructed vision through the opening 16 of the glare shield 12. The upper and end edges of the auxiliary shield 14 are positioned in a groove 48 of the glare shield 12, as shown in Figure 3.

The shield 12 is provided with a bracket 50, the base of which is secured to the shield by a fastener, such as the rivet 52, and the extended end of the bracket is provided with arms 54 and 56 in which a base 58 of a clevis having a shank 60 and extended arms 62 and 64 is pivotally mounted with a pin 66. The shank 60 is rotatably mounted in a socket 68 in the extended end of the base 58 and the end of the arm 18 is pivotally mounted between the arms 62 and 64 with a pin 70.

The jaws 26 and 28 of the clamp for mounting the rails 22 and 24 on a visor 72 are provided with flanges 74 and 76 through which a bolt 78 extends and the bolt is provided with a nut 80 with which the jaws are drawn into clamping relation with the visor. The tube 20 is pivotally mounted on the arcuate bar 30 with a bolt 82, and, as shown in Figure 3, the rail or guide 24 is provided with notches 84 into which the tube 20 is adapted to snap to facilitate retaining the tube and shield in adjusted positions, as shown by the broken lines in Figure 1.

*Operation*

With the parts assembled as illustrated and described the improved multi-position glare shield of this invention is adapted to be clamped on a visor of a motor vehicle and as the point from which glare rays emanate shifts from one position to another the shield 12 may be readily shifted to compensate for the changing path of the glare rays, and when clear and unobstructed vision is desired the said auxiliary shield 14 is pivoted upwardly opening the notch 16 of the glare shield 12. By this means the telescoping arm or member on the end of which the shield is carried is adapted to slide between the rails or guides 22 and 24 whereby the arm is supported in substantially all positions. With this universal mounting the shield is adapted to intercept rays of light from the front, rear, or sides, and also from substantially any angle along the corners or sides of the vehicle.

From the foregoing specification, it will become apparent that the invention disclosed will adequately accomplish the functions for which it has been designed and in an economical manner, and that its simplicity, accuracy, and ease of operation are such as to provide a relatively inexpensive device, considering what it will accomplish, and that it will find an important place in the art to which it appertains when once placed on the market.

It is thought that persons skilled in the art to which the invention relates will be able to obtain a clear understanding of the invention after considering the description in connection with the drawings. Therefore, a more lengthy description is regarded as unnecessary.

Changes in shape, size and rearrangement of details and parts such as come within the purview of the invention claimed may be resorted to in actual practice, if desired.

Having now described the invention that which is claimed to be new and desired to be procured by Letters Patent is:

1. A multi-position glare shield comprising a panel of translucent material, said panel having a notch in the lower side, an auxiliary shield hinged to the glare shield and positioned to cover said notch, a telescoping arm adjustably connected to the shield, means for pivotally mounting the telescoping arm on a visor of a vehicle, and semi-circular guide means for supporting the arm.

2. A glare shield comprising a panel of translucent material, said panel having a notch in the lower edge, an auxiliary shield hinged to the glare shield and positioned to cover the notch in the lower edge of the panel thereof, jaws adapted to be clamped over edges of a visor of a motor vehicle, a telescoping arm for pivotally mounting the device upon the jaws, and arcuate spaced guide rails positioned on a radius the center of which is positioned on the pivotal mounting of the telescoping arm to support the pivotal mounting means.

3. A glare shield comprising a mounting panel of translucent material, said panel having an opening in the lower edge, an auxiliary panel, also of translucent material, hinged to the mounting panel and positioned to cover the opening in the lower edge thereof, a clamp having jaws adapted to be clamped over edges of a visor of a motor vehicle, an arm pivotally connected to said mounting panel at one end thereof and positioned with the opposite end pivotally connected to the clamp adapted to be positioned on a visor of a motor vehicle, and spaced arcuate guide rails between which said arm is slidably mounted.

4. A glare shield comprising a panel of translucent material, said panel having a notch in the lower edge, an auxiliary panel, also of translucent material, hinged to the panel having the notch therein, a clamp adapted to be secured on a visor of a motor vehicle, a telescoping arm pivotally mounted on said clamp, spaced semi-circular guide rails between which the telescoping arm is positioned, said guide rails being positioned on a radius the center of which is positioned on the pivotal mounting of the telescoping arm, a clevis pivotally mounted on the extended end of the arm, and means pivotally connecting the panel having the notch therein to the clevis.

5. In a glare ray obstructing device, the combination which comprises a panel of translucent material, said panel being adapted to provide a glare shield and having a notch in the lower edge, an auxiliary panel hinged to the panel having the notch in the lower edge and positioned to cover said notch, a clamp adapted to be secured on a visor of a motor vehicle, spaced semi-circular rails mounted on said clamp, an arm pivotally mounted on the clamp and positioned to slide between the rails, one of said rails having notches therein for retaining the arm in adjusted positions, and a universal joint connecting the panel having the notch in the lower edge to the end of the arm.

References Cited in the file of this patent

UNITED STATES PATENTS

| | | |
|---|---|---|
| 1,561,034 | Sperl | Nov. 10, 1925 |
| 1,571,097 | Redman | Jan. 26, 1926 |
| 2,212,007 | Buchanan | Aug. 20, 1940 |
| 2,673,118 | Phelps | Mar. 23, 1954 |

FOREIGN PATENTS

| | | |
|---|---|---|
| 665,300 | France | May 6, 1929 |
| 1,091,039 | France | Oct. 27, 1954 |